United States Patent
Lee et al.

(10) Patent No.: US 10,149,256 B2
(45) Date of Patent: Dec. 4, 2018

(54) METHOD FOR CONTROLLING POWER FOR DEVICE-TO-DEVICE (D2D) COMMUNICATION IN WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Inkwon Seo, Anyang-si (KR); Hanbyul Seo, Anyang-si (KR); Joonkui Ahn, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 14/411,219

(22) PCT Filed: Jul. 5, 2013

(86) PCT No.: PCT/KR2013/006003
§ 371 (c)(1),
(2) Date: Dec. 24, 2014

(87) PCT Pub. No.: WO2014/007581
PCT Pub. Date: Jan. 9, 2014

(65) Prior Publication Data
US 2015/0124737 A1    May 7, 2015

Related U.S. Application Data

(60) Provisional application No. 61/668,435, filed on Jul. 5, 2012, provisional application No. 61/673,712, filed (Continued)

(51) Int. Cl.
*H04W 52/34* (2009.01)
*H04W 52/28* (2009.01)
(Continued)

(52) U.S. Cl.
CPC ......... *H04W 52/346* (2013.01); *H04W 52/28* (2013.01); *H04W 52/383* (2013.01); *H04W 52/16* (2013.01); *H04W 52/281* (2013.01)

(58) Field of Classification Search
None
See application file for complete search history.

(56) References Cited

U.S. PATENT DOCUMENTS

2008/0270619 A1* 10/2008 Davies .................... H04L 63/08
709/229
2009/0005094 A1*  1/2009 Lee ..................... H04W 52/383
455/509
(Continued)

FOREIGN PATENT DOCUMENTS

KR    10-2009-0020769 A    2/2009

*Primary Examiner* — Jason E Mattis
*Assistant Examiner* — Hong Shao
(74) *Attorney, Agent, or Firm* — Birch, Stewart, Kolasch & Birch, LLP

(57) ABSTRACT

A method for a terminal controlling power in a wireless communication system, according to the present invention, comprises the steps of: receiving from a base station power setting information on the difference in power setting values between a first channel for eNodeB-to-device (eNB2D) communication, and a second channel for device-to-device (D2D) communication; and controlling the power of the first channel and/or the second channel in accordance with the power setting information, wherein the power is controlled in accordance with a predetermined priority, which is based on a plurality of channels and a plurality of transmitted data items, which are different from each other are simultaneously transmitted by the terminal at a specific time.

2 Claims, 12 Drawing Sheets

Related U.S. Application Data on Jul. 19, 2012, provisional application No. 61/820,674, filed on May 7, 2013.

(51) Int. Cl.
*H04W 52/38* (2009.01)
*H04W 52/16* (2009.01)

(56) References Cited

U.S. PATENT DOCUMENTS

| | | | |
|---|---|---|---|
| 2009/0011770 A1 | 1/2009 | Jung et al. | |
| 2010/0285830 A1* | 11/2010 | Englund | H04W 52/146 |
| | | | 455/522 |
| 2012/0163195 A1 | 6/2012 | Son | |
| 2013/0058315 A1* | 3/2013 | Feuersanger | H04W 52/281 |
| | | | 370/336 |
| 2013/0230032 A1* | 9/2013 | Lu | H04W 76/043 |
| | | | 370/336 |
| 2013/0310103 A1* | 11/2013 | Madan | H04W 52/242 |
| | | | 455/522 |
| 2014/0321314 A1* | 10/2014 | Fodor | H04W 72/085 |
| | | | 370/252 |

* cited by examiner

FIG. 2
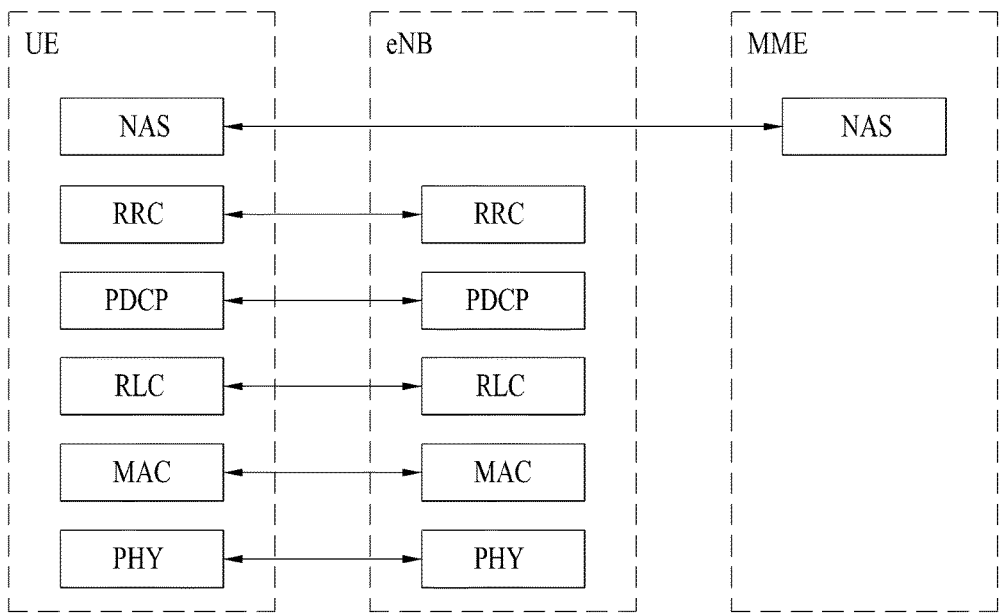
(a) control-plane protocol stack
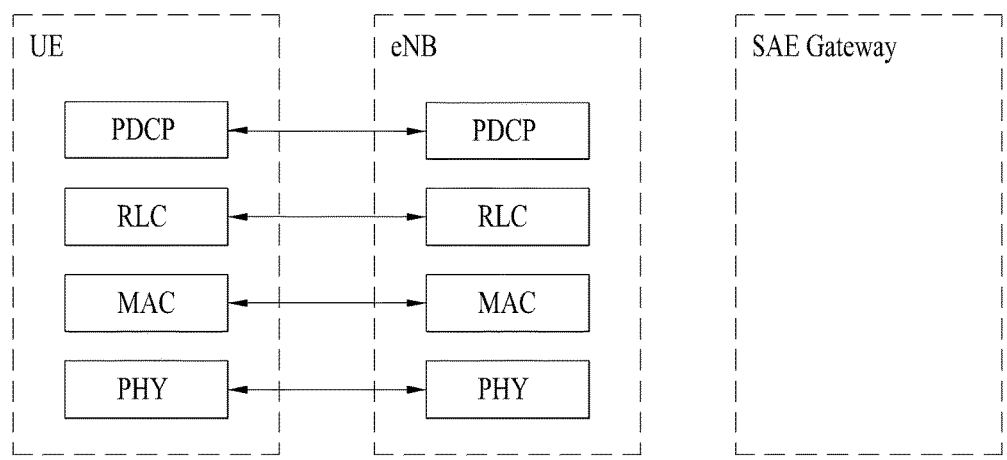
(b) user-plane protocol stack

FIG. 8
(a)
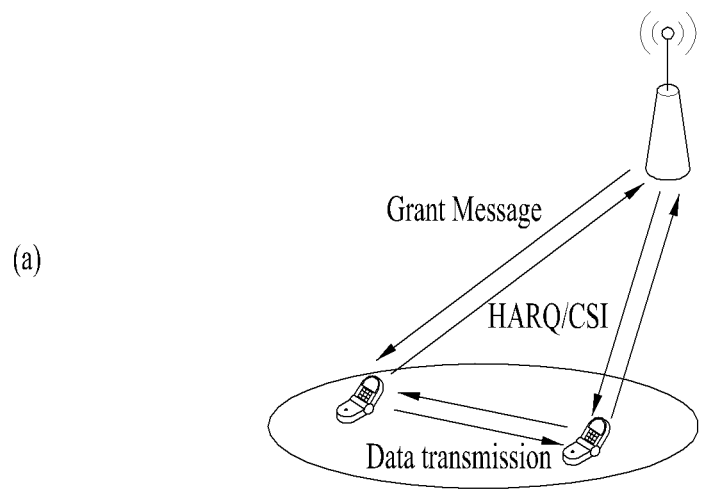
(b)
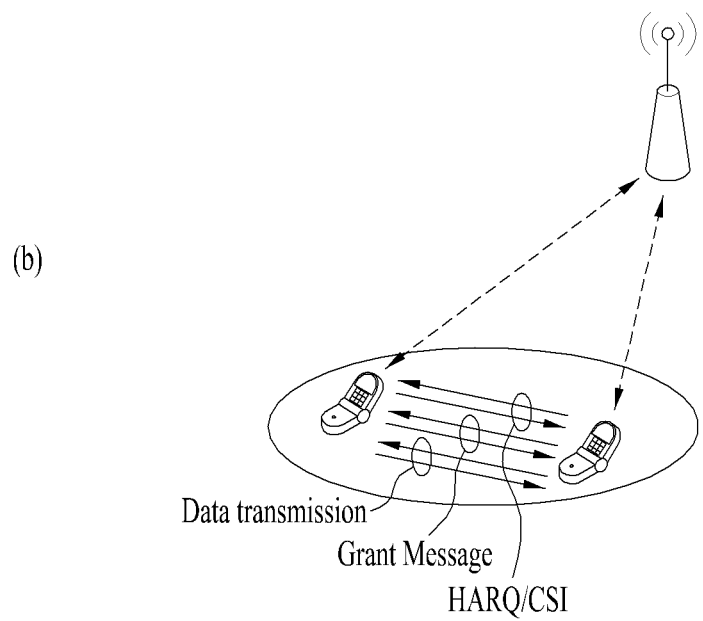

METHOD FOR CONTROLLING POWER FOR DEVICE-TO-DEVICE (D2D) COMMUNICATION IN WIRELESS COMMUNICATION SYSTEM AND APPARATUS FOR SAME

CROSS REFERENCE TO RELATED APPLICATIONS

This application is the National Phase of PCT International Application No. PCT/KR2013/006003, filed on Jul. 5, 2013, which claims priority under 35 U.S.C. 119(e) to U.S. Provisional Application No. 61/668,435, filed on Jul. 5, 2012, U.S. Provisional Application No. 61/673,712, filed on Jul. 19, 2012, and U.S. Provisional Application No. 61/820,674, filed on May 7, 2013, all of which are hereby expressly incorporated by reference into the present application.

TECHNICAL FIELD

The present invention relates to wireless communication system, and more particularly, to a method for controlling a power for D2D communication in a wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The user equipment reports status information of a current channel to the base station periodically and/or non-periodically to assist the base station to efficiently manage the wireless communication system. Since the reported status information may include results calculated considering various statuses, more efficient reporting method will be required.

DISCLOSURE

Technical Problem

Based on the aforementioned discussion, an object of the present invention devised to solve the conventional problem is to provide to a method for controlling a power for D2D communication in a wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for enabling a user equipment to control a power in a wireless communication system comprises the steps of receiving, from a base station, power configuration information on the difference in power configuration values between a first channel for eNodeB-to-device (eNB2D) communication and a second channel for device-to-device (D2D) communication; and controlling the power of at least one of the first channel and the second channel in accordance with the power configuration information, wherein the power is controlled in accordance with a predetermined priority on the basis of a plurality of different channels and a plurality of different transmission data, which are simultaneously transmitted from the user equipment at a specific time.

Moreover, the method further comprises the step of receiving information on the predetermined priority by using higher layer signaling.

Moreover, the predetermined priority is configured differently depending on whether information associated with the eNB2D communication is transmitted through a physical uplink control channel (PUCCH).

Moreover, the predetermined priority is configured differently depending on whether information associated with the D2D communication is transmitted through a physical uplink shared channel (PUSCH).

Moreover, the method further comprises the step of enabling the user equipment to transmit a discovery signal configured for synchronization with an external user equipment which joins D2D communication, wherein the predetermined priority is re-adjusted for transmission of the discovery signal.

Moreover, the power configuration information may include information on a maximum allowance value of the difference in the power configuration values between the plurality of channels, and the power is controlled by dropping some of the first channel and the second channel if the difference in the power configuration values between the first channel and the second channel exceeds the maximum allowance value at the specific time, or the power is controlled by scaling-down some of the first channel and the second channel if the difference in the power configuration values between the first channel and the second channel exceeds the maximum allowance value at the specific time.

Furthermore, the first channel and the second channel are respectively configured for different component carriers (CCs).

Moreover, the power configuration information includes a power control parameter for the D2D communication.

Moreover, the method further comprises the step of reporting a difference value in the power configuration values between different kinds of channels at the specific time to the base station. Moreover, the reporting is performed periodically. Alternatively, the reporting is configured to be performed only if a previously defined even is triggered. The difference value in the power configuration values between different kinds of channels is a difference value in power values between the first channel and the second channel at the specific time.

Moreover, the method further comprises the step of reporting a difference value in the power configuration values, which may additionally be allowed between different kinds of channels at the specific time, to the base station.

Advantageous Effects

According to the present invention, power control for D2D communication in the wireless communication system may effectively be performed.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

FIG. 8 is a reference diagram illustrating D2D (UE-to-UE) communication;

BEST MODE FOR CARRYING OUT THE INVENTION

Figure 1:
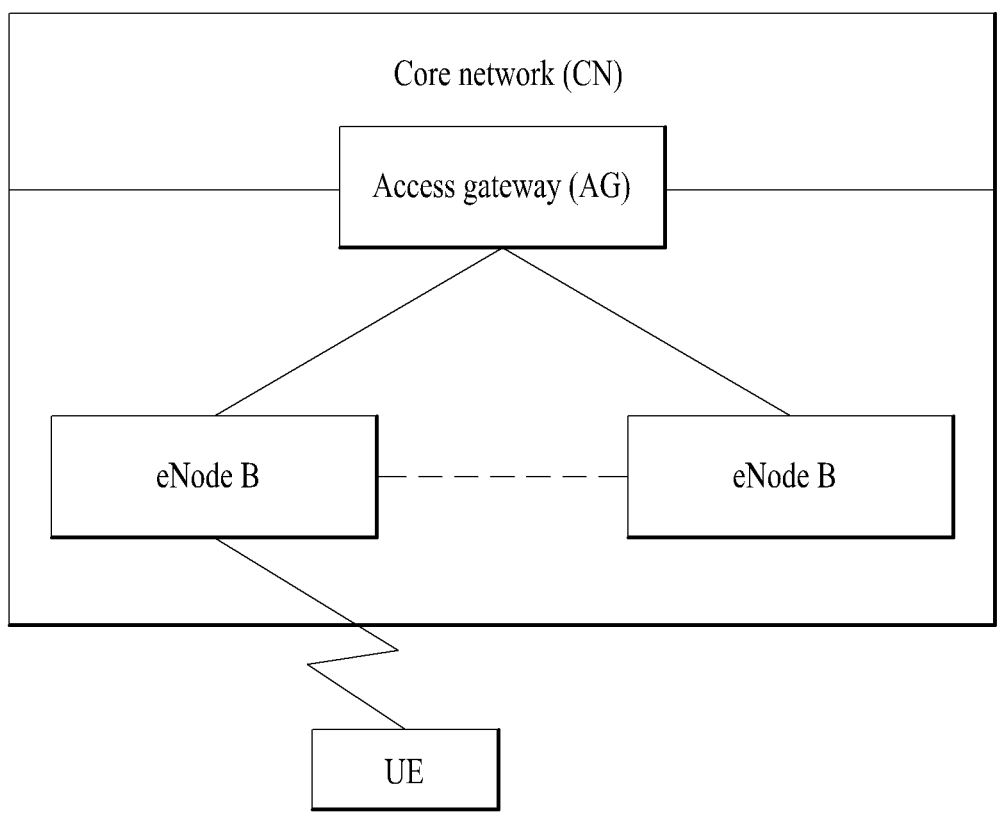
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
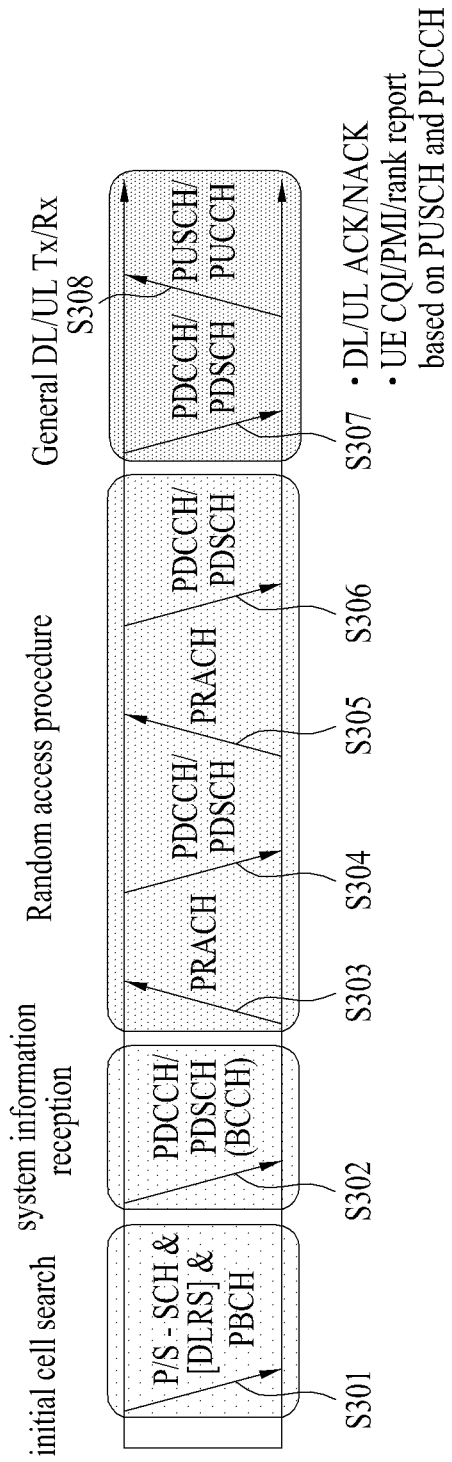
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
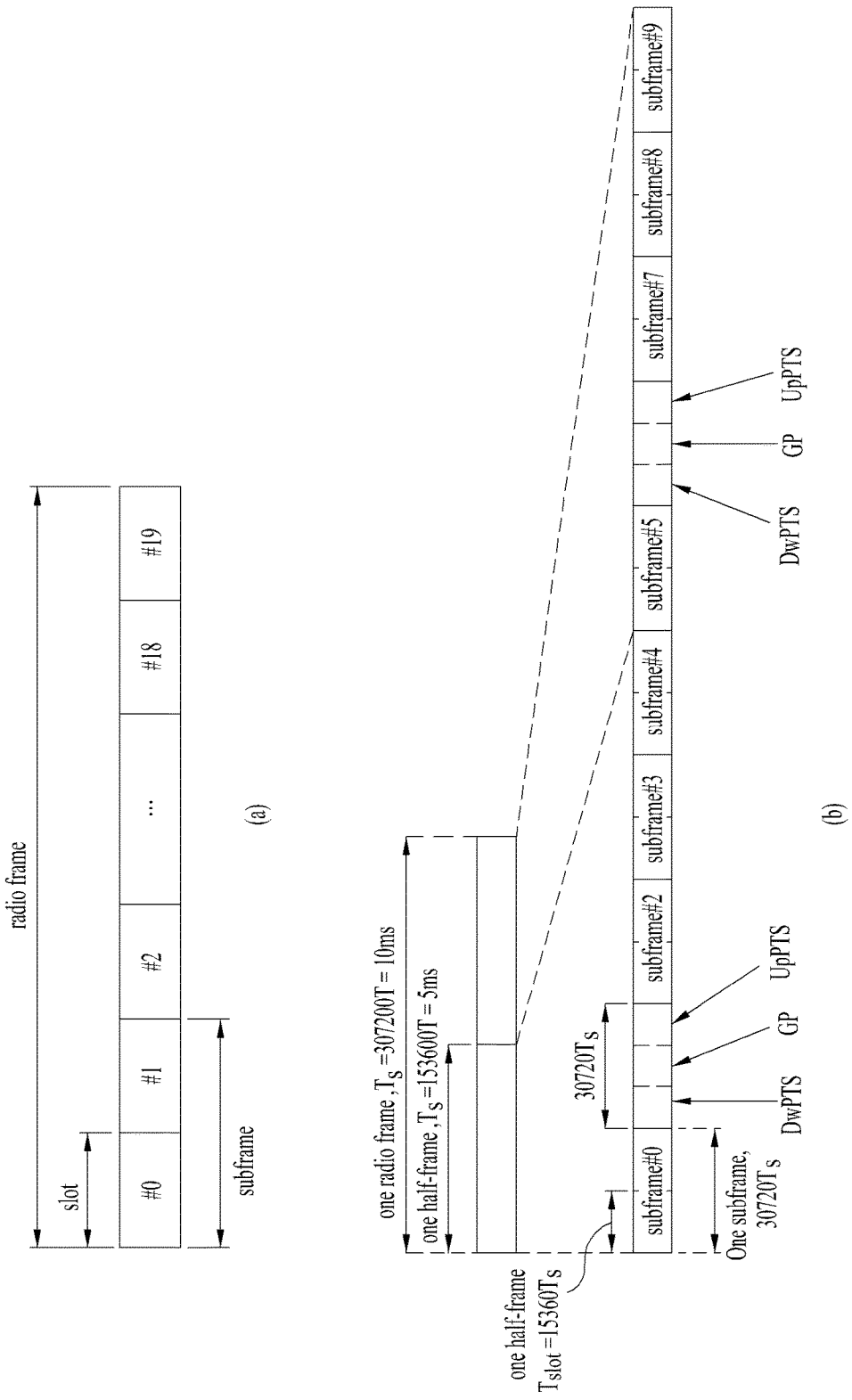
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
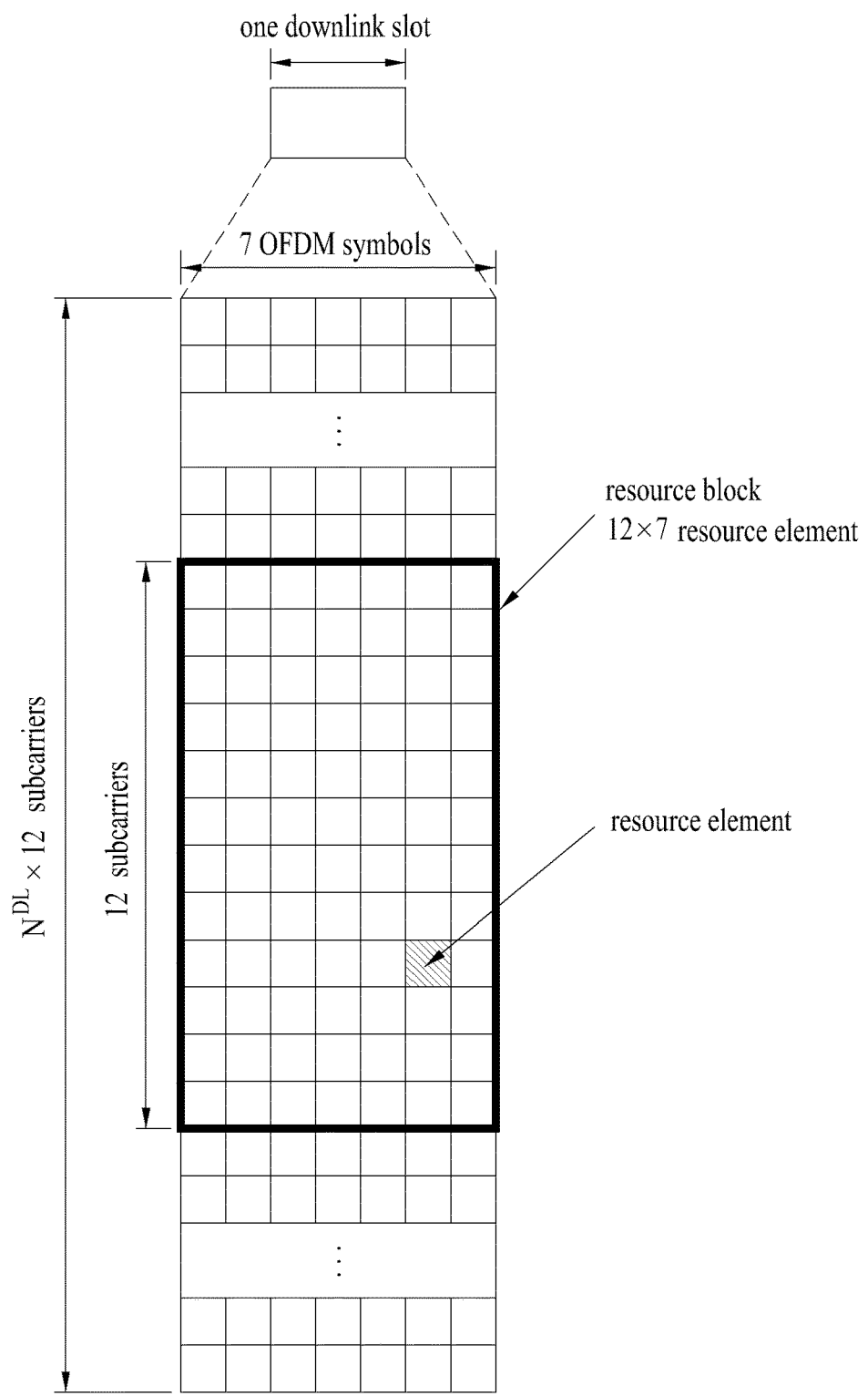
FIG. 5 is a diagram illustrating an example of a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain.

Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
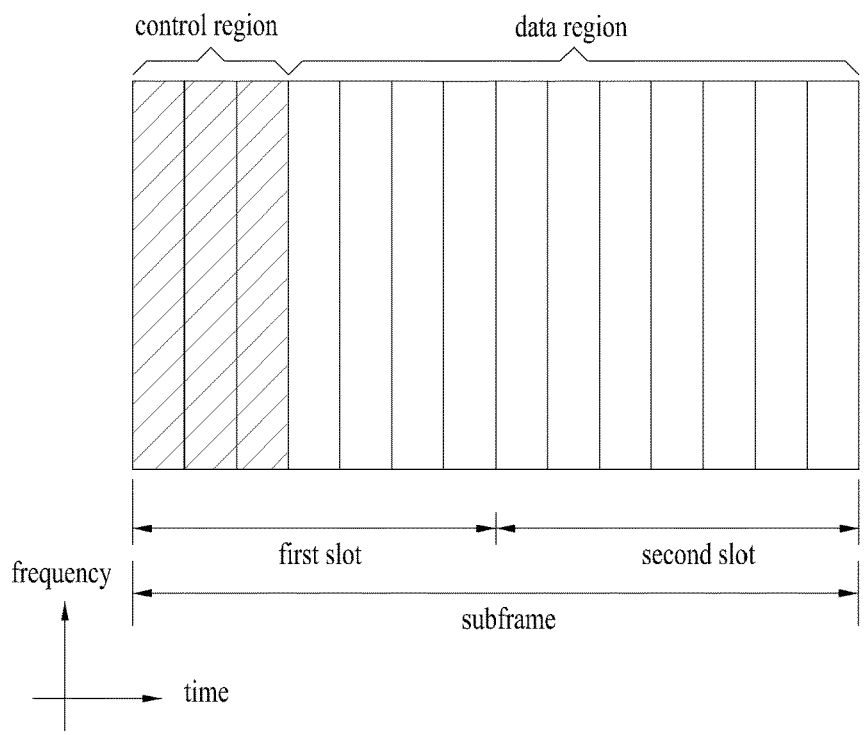
FIG. 6 is a diagram illustrating a structure of a downlink radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
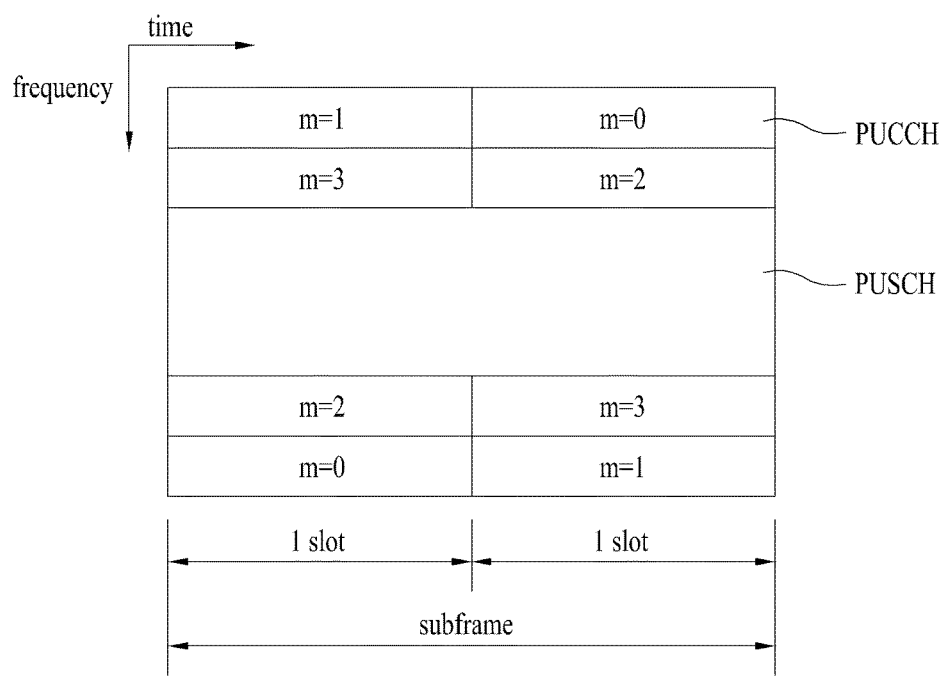
FIG. 7 is a diagram illustrating a structure of an uplink subframe used in an LTE system.

FIG. 7 is a diagram illustrating a structure of an uplink subframe used in an LTE system.

Referring to FIG. 7, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.
- SR (Scheduling Request): is information used to request uplink UL-SCH resource. The SR is transmitted using an on-off keying (OOK) system.
- HARQ ACK/NACK: is a response signal to a downlink data packet on the PDSCH. It represents whether the downlink data packet has been successfully received. ACK/NACK 1 bit is transmitted in response to a single downlink codeword (CW), and ACK/NACK 2 bits are transmitted in response to two downlink codewords.
- CSI (Channel State Information): is feedback information on a downlink channel. The CSI includes CQI (Channel Quality Indicator), and MIMO (Multiple Input Multiple Output) related feedback information includes a rank indicator (RI), a precoding matrix indicator (PMI), a precoding type indicator (PTI), etc. 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH.

Hereinafter, D2D (UE-to-UE) communication will be described.

D2D communication system may be divided into two cases, that is, a case where D2D communication is performed by assistance of a network/coordination station (for example, base station) and a case where D2D communication is performed without assistance of a network/coordination station.

Referring to FIG. 8, in FIG. 8(a), the network/coordination station is involved in transmission and reception of a control signal (for example, grant message), HARQ, channel state information, etc., and data transmission and reception is only performed between user equipments that perform D2D communication. Also, in FIG. 8(b), the network provides minimum information only (for example, D2D connection information available in a corresponding cell), and user equipments that perform D2D communication form a link and perform data transmission and reception.

Hereinafter, under an environment that communication between UEs (that is, UE-to-UE communication, D2D) and communication between base station (eNB) and UE (that is, eNB-to-UE communication (eNB2D)) are performed together, a method for efficiently performing a power control of D2D or eNB2D communication in accordance with the present invention will be suggested.

For convenience of description, the method suggested in the present invention will be described based on the 3GPP LTE system. However, the range of the system to which the method suggested in the present invention is applied may be extended to another system in addition to the 3GPP LTE system.

Also, the method suggested in the present invention may be applied to all the cases where D2D communication is performed based on time/frequency resource regions previously defined under an FDD system or TDD system. For example, some of existing radio resources may be reused under the FDD system or TDD system, or radio resource for D2D communication may newly be configured (or allocated), whereby D2D communication may be performed based on the time/frequency resource regions.

Accordingly, the methods suggested in the present invention may be applied to even a case where D2D communication is performed through various types of radio resource regions which are previously defined, as well as a case where D2D communication is performed based on the existing uplink radio resource.

Figure 9:
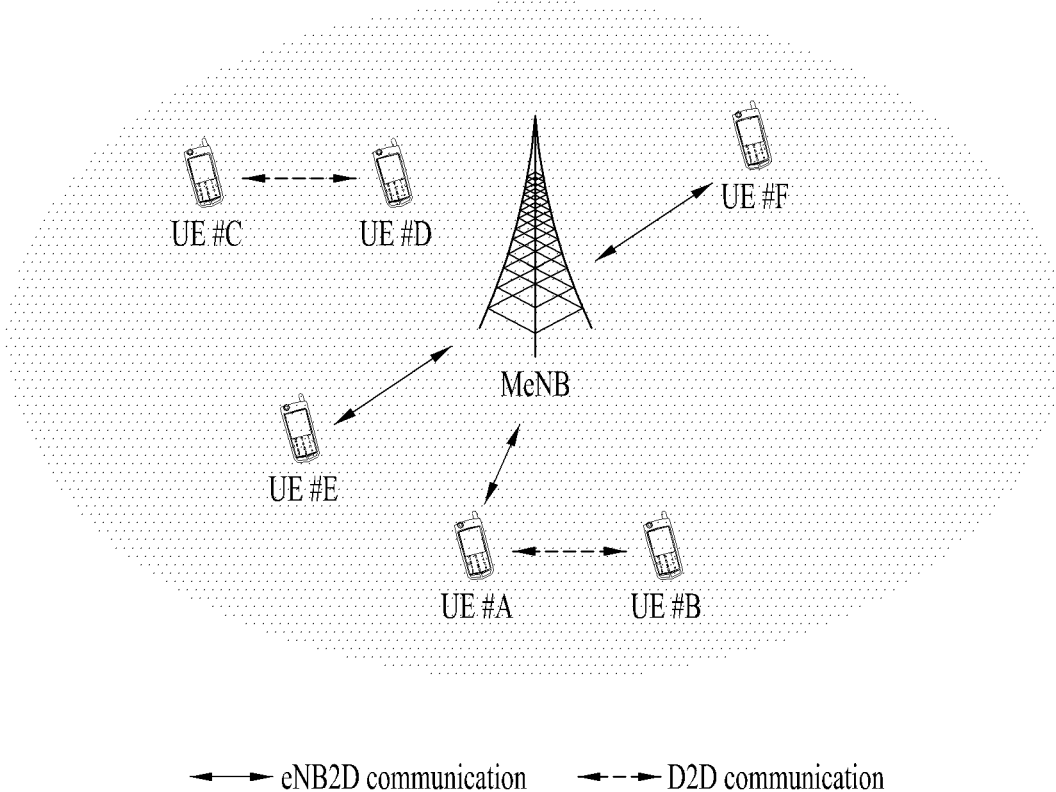
FIG. 9 is a diagram illustrating that some region of existing uplink radio resources is re-used for D2D communication between UEs in a state that D2D communication and eNB2D communication coexist on a network.

First of all, a case where some region of the existing uplink radio resource is reused for D2D communication between the UEs in a state that D2D communication and eNB2D communication coexist on the network will be described with reference to FIG. 9. In FIG. 9, D2D communication is performed between UE#A and UE#B or between UE#C and UE#D, and eNB2D communication is performed between MeNB and UE#E, between MeNB and UE#F, and between MeNB and UE#A.

Referring to FIG. 9, a status may occur in that a specific user equipment should transmit D2eNB communication related control/data information and D2D communication related data/control information at the same time. For example, if some of the existing uplink radio resources is reused for D2D communication, the user equipment should simultaneously transmit D2eNB communication related control/data information (for example, periodic/aperiodic channel information or ACK/NACK information) and D2D communication related data/control information at a specific time.

However, since the distance between UEs that join D2D communication is relatively shorter than the distance between UE and eNB, which join D2eNB communication, in view of a specific UE, a big difference may occur between a power configuration value for control information transmitted to the eNB and a power configuration value for data information transmitted to another UE.

In this way, if a big difference occurs between the power configuration values for different kinds of channels (or information) transmitted from the transmitter at the same time, a problem may occur in a normal operation of hardware (for example, amplifier) or software (for example, signal process module) related to signal transmission of the transmitter, a problem may occur in decoding performance of a corresponding signal of the receiver, or channel transmission of high power may act as strong interference on D2D data signal/discovery signal reception operation of UEs that join D2D communication. For example, a problem, such as In-band Emission, may occur, in which a channel of high power acts as interference on a channel of low power due to non-ideal properties of an amplifier related to signal transmission of the transmitter, and a problem may occur in that channel transmission of high power acts as strong interference on relatively low power based D2D communication of UEs that join D2D communication.

Accordingly, the present invention suggests a method for effectively performing power control of different kinds of channels or information when a big difference occurs between power configuration values of the corresponding channels or information simultaneously transmitted at a specific time or duplicately transmitted at some time interval.

The method suggested in the present invention may be applied to even all the cases (for example, CoMP environment) where a plurality of channels or information transmitted from a specific UE are transmitted to different receivers as well as a case where the UE performs control/data information transmission for D2eNB communication and data/control information transmission for D2D communication simultaneously at a specific time or duplicately at some time interval.

Also, the method suggested in the present invention may additionally be applied to even a case where D2eNB communication related control/data information transmission timing point and D2D communication related data/control information transmission timing point are partially duplicated, as well as a case where a specific UE should transmit D2eNB communication related control/data information and D2D communication related data/control information at the same time.

For example, the method suggested in the present invention may be applied to even a case where different kinds of information transmission timing points are partially duplicated in view of a specific UE when the specific UE performs corresponding communication (that is, D2eNB communication, D2D communication) by respectively using a timing advance (TA) value for D2eNB communication and a TA value for D2D communication, wherein each TA value is measured or calculated based on an independent procedure which is previously defined.

Also, the method suggested in the present invention may be applied to even a case where UEs that join D2D communication perform communication with the same base station or respectively perform communication with their respective base stations different from each other.

Additionally, the methods suggested in the present invention may be configured to be restrictively applied to a mode configured such that the UE simultaneously performs D2eNB uplink communication related control/data information transmission and D2D communication related data/control information transmission, or/and a mode configured such that the UE simultaneously performs uplink data information (PUSCH) transmission and uplink control information (PUCCH) transmission. Also, the present invention may be restrictively applied to a specific UE type as well as the specific mode. For example, the methods suggested in the present invention may be restrictively applied to a UE type having a capability for simultaneously performing D2eNB uplink communication related control/data information transmission and D2D communication related data/control information transmission or UE type having a capability for simultaneously performing uplink data information (PUSCH) transmission and uplink control information (PUCCH) transmission.

Figure 10:
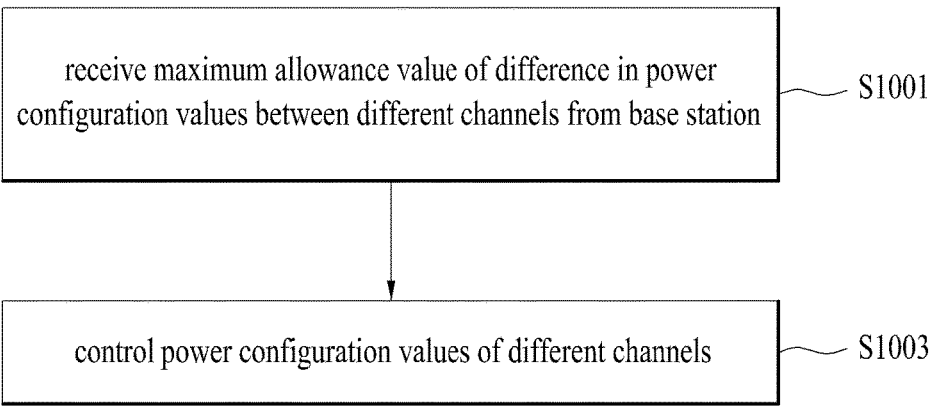
FIGS. 10 and 11 are diagrams illustrating a method for controlling a power for a plurality of channels according to the embodiment of the present invention.

FIG. 10 is a diagram illustrating a method for controlling a power for a plurality of channels according to the embodiment of the present invention.

Referring to FIG. 10, the base station may notify the user equipment of a maximum allowance value of a difference in power configuration values between different kinds of channels or information simultaneously transmitted at a specific time or duplicately transmitted at some time interval through higher layer signaling or physical layer signaling (S1000).

Accordingly, the user equipment may control the power configuration values of the plurality of channels at a specific time previously defined or on a specific time interval to satisfy the maximum allowance value of the difference in the power configuration values between the different kinds of channels (S1001).

In other words, the user equipment may control the power configuration values of the plurality of channels in such a way to lower a power value of a specific channel set to high power within the range of a maximum power value (P_max) that may be set, enhance a power value of a specific channel set to low power, or simultaneously control the power configuration values of the plurality of channels on the basis of a value calculated through a function which is previously defined and has the difference in the power configuration values between the channels as an input parameter. Moreover, the maximum power value that may be set at a previously defined specific time or a specific time interval may be designated in accordance with a category of the user equipment.

Through power control of the user equipment, the difference in the power configuration values between the channels transmitted from the user equipment may be equal to or smaller than the maximum allowance value of the difference in the power configuration values received from the base station. Alternatively, sum of the power configuration values between the channels transmitted from the user equipment may be equal to or smaller than the maximum power value P_max that may be set at a specific time or specific time interval of the user equipment.

Moreover, on a specific time or specific time interval after the power configuration value of the specific channel is controlled (S1000) to satisfy the maximum allowance value of the difference in the power configuration values in accordance with the present invention, sum of transmission powers of the channels simultaneously transmitted or duplicately transmitted at some time interval may exceed the range of the maximum power value of the user equipment, which is previously defined (or designated by the category of the user equipment). In this case, the user equipment may be configured to satisfy the range of the maximum power value by scaling down a transmission power per channel or dropping or omitting some of the channels in accordance with a priority rule which is additionally set in advance.

Figure 11:
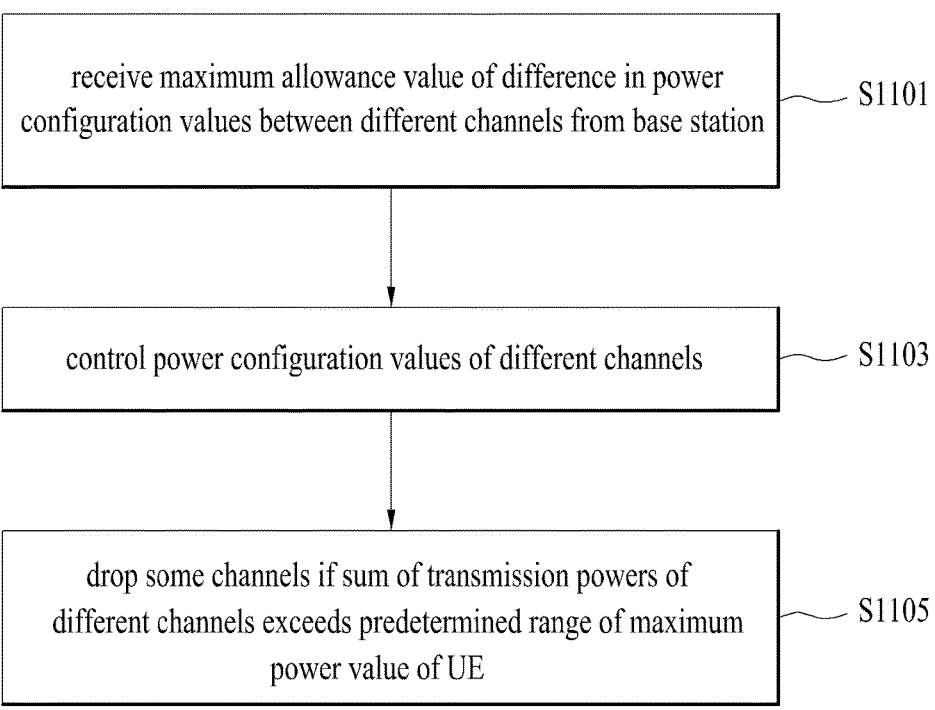

In other words, referring to FIG. 11, after the user equipment receives the maximum allowance value of the difference in the power configuration values between different channels from the base station (S1101) and thus controls the power configuration values of the plurality of channels (S1103), the user equipment may drop some channels if sum of the transmission powers of the channels simultaneously transmitted at a specific time exceeds the range of the maximum power value of the user equipment, wherein the maximum power value is previously defined.

Hereinafter, the priority rule that may be applied to the present invention will be described. For example, the corresponding priority rule may be applied to the present invention when the transmission power per channel is scaled down or some of the channels is dropped or omitted.

The transmission power per channel may be controlled in the order from the channel of low priority to the channel of high priority.

Hereinafter, in this specification, for convenience of description, if "A→B" is expressed, it is defined that channel or information corresponding to A has a lower priority in a transmission power control operation than channel or information corresponding to B. Accordingly, the channel or information corresponding to A may be dropped prior to the channel or information corresponding to B, or its transmission power may be scaled down prior to the channel or information corresponding to B. Of course, scaling-down operation of the transmission power per channel according to the priority, or dropping or omitting of the channel according to the priority may be applied to even a case where sum of the power configuration values for different kinds of channels (or information) simultaneously transmitted at a specific time or duplicately transmitted at some time interval is greater than or smaller than the maximum power value P_max that may be set at the specific time or specific time interval of the user equipment, which is previously defined.

Hereinafter, if the power configuration values of different kinds of channels (or information) simultaneously transmitted at a specific time or duplicately transmitted at some time interval are changed on the basis of the maximum allowance value of the difference in the power configuration values designated from the base station in accordance with the present invention, embodiments that the power configuration value per channel is changed on the basis of the previously defined priority will be described in more detail. In this case, information and application of the priority rule for change of the power configuration values according to the present invention may be notified from the base station to the user equipment through higher layer signaling or physical layer signaling.

Also, the priority for the change of the power configuration values may be defined on the basis of kinds of information transmitted through a specific channel or importance priority per information which is previously defined.

Hereinafter, the embodiments of the present invention will be described. In the following embodiments, it is assumed that D2D communication is performed on the basis of a predetermined region of the existing uplink radio resources. Also, it is assumed that the user equipment performs D2eNB communication related information transmission through channel #A (for example, PUCCH) and D2D communication related information transmission through channel #B (for example, PUSCH) simultaneously at a specific time or duplicately at some time interval. For example, control information such as periodic/aperiodic channel information or ACK/NACK information may be transmitted through the channel #A, or data information may be transmitted through the channel #B.

Moreover, the embodiments of the present invention may be applied to even a case where the user equipment transmits a D2eNB communication related reference signal (for example SRS) through channel #C (or some resource region of the channel #B) which is previously defined. Also, the D2eNB communication related reference signal based on the channel #C (or channel #B) may be defined as the lowest priority (that is, the power configuration value is first changed) in configuration of the priority rule for the change of the power configuration value per channel.

First Embodiment

In accordance with the first embodiment of the present invention, a priority may be given to different kinds of channels and information, whereby power control may be performed.

For example, power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information".

Also, the power configuration values may be set to be changed in the order of "channel #B based D2D communication related data information→channel #A based D2eNB communication related control information→channel #B based D2D communication related control information or data/control information (for example, a case where data information and control information are transmitted together, or a case where control information is transmitted together with data information by piggy-back)".

Alternatively, the power configuration values may be set to be changed in the order of "channel #A based D2eNB communication related control information→channel #B based D2D communication related data information→channel #B based D2D communication related control information or data/control information (for example, a case where data information and control information are transmitted together, or a case where control information is transmitted together with data information by piggy-back)".

Second Embodiment

In accordance with the second embodiment of the present invention, priority for change of power configuration values between a plurality of channels may be varied depending on whether D2eNB communication related specific information (for example, control information) which is previously selected or defined is transmitted through channel #A (for example, PUCCH). In this case, D2eNB communication related specific information (that is, control information) which is previously selected or defined may be notified from the base station to the user equipment through higher layer signaling or physical layer signaling, and may be at least one of RI (rank indicator) information, CQI information, PMI (precoding matrix indicator) information, and (D2D or D2eNB communication related) ACK/NACK information (transmitted through channel #A).

For example, it is assumed that the power is controlled depending on whether D2eNB communication related specific control information which is previously defined is transmitted based on the channel #A.

In this case, if D2eNB communication related specific control information which is previously defined is transmitted based on the channel #A, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information". By contrast, if D2eNB communication related specific control information which is previously defined is not transmitted based on the channel #A, the power configuration values may be set to be changed in the order of "channel #B based D2D communication related data information→channel #A based D2eNB communication related control information"→channel #B based D2D communication related control information or data/control information (for example, a case where data information and control information are transmitted together, or a case where control information is transmitted together with data information by piggy-back)".

Alternatively, it is assumed that the power is controlled depending on whether D2eNB communication related specific control information which is previously defined is transmitted based on the channel #A.

Under the assumption, if D2eNB communication related specific control information which is previously defined is transmitted based on the channel #A, the user equipment may be configured to perform the change of the power configuration values in the order of "channel #B based D2D communication related data information→channel #A based D2eNB communication related control information→channel #B based D2D communication related control information or data/control information (for example, a case where data information and control information are transmitted together, or a case where control information is transmitted together with data information by piggy-back)". By contrast, if D2eNB communication related specific control information which is previously defined is not transmitted based on the channel #A, the user equipment may be configured to perform the change of the power configuration values in the order of "channel #A based D2eNB communication related control information→channel #B based D2D communication related data information"→channel #B based D2D communication related control information or data/control information (for example, a case where data information and control information are transmitted together, or a case where control information is transmitted together with data information by piggy-back)".

Third Embodiment

Although the second embodiment discloses that a power control priority of the user equipment is determined depending on whether D2eNB communication related specific information is transmitted through a specific channel, the power control priority of the user equipment may be applied even to D2D communication similarly to the second embodiment.

In other words, according to the third embodiment of the present invention, a priority for change of power configuration values between a plurality of channels may be varied depending on whether D2D communication related specific information (for example, control information) which is previously selected or defined is transmitted through channel #B (for example, PUSCH). In this case, D2D communication related specific information (that is, control information) which is previously selected or defined may be at least one of RI information, CQI information, PMI information, (D2D or D2eNB communication related) ACK/NACK information (transmitted through channel #B), a synchronization signal (or following discovery signal) for synchronization between the user equipments that perform D2D communication, and information as to whether D2D data communication will be performed (actually at D2D communication step after D2D discovery step).

For example, in the third embodiment of the present invention, it is assumed that the power is controlled depending on whether D2D communication related specific control information which is previously defined is transmitted based on the channel #B.

In this case, if D2D communication related specific control information which is previously defined is transmitted based on the channel #B, the power configuration values may be set to be changed in the order of "channel #B based D2D communication related data information→channel #A based D2eNB communication related control information→channel #B based D2D communication related control information or data/control information (for example, a case where data information and control information are transmitted together, or a case where control information is transmitted together with data information by piggy-back)". By contrast, if D2D communication related specific control information which is previously defined is not transmitted based on the channel #B, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information".

Alternatively, if D2D communication related specific control information which is previously defined is transmitted based on the channel #B, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information". By contrast, if D2D communication related specific control information which is previously defined is not transmitted based on the channel #B, the power configuration values may be set to be changed in the order of "channel #B based D2D communication related control information or data/control information (for example, a case where data information and control information are transmitted together, or a case where control information is transmitted together with data information by piggy-back)→channel #B based D2D communication related data information→channel #A based D2eNB communication related control information".

Fourth Embodiment

In the fourth embodiment of the present invention, it is assumed that a specific signal is defined for discovery or check between a user equipment, which requests transmission and reception of at least one of specific control information, data information, and data/control information (for example, a case where data information and control information are transmitted together, or a case where control information is transmitted together with data information by piggy-back) through D2D communication, and a user equipment which is a target of D2D communication of the requested user equipment. Alternatively, it may be assumed that a specific signal is previously defined to support a synchronization operation between the user equipments that join D2D communication or a channel estimation operation between the user equipments that join D2D communication.

Hereinafter, for convenience of description, the specific signal defined for the above intention will be defined as a "discovery signal".

For example, it may be assumed that the discovery signal is transmitted through channel #D which is a resource region of at least a part of the previously defined channel #B (for example, PUSCH, SRS, DM-RS, RACH) or a resource region newly defined for discovery signal transmission.

In this case, according to the fourth embodiment of the present invention, the priority related to a change of power configuration values of the channel to which the discovery signal is transmitted may be configured differently from a case where D2D communication related data information or control information is transmitted through a corresponding channel (that is, channel #B or channel #D).

Accordingly, the priority for power control will be configured by combination of the first embodiment and the fourth embodiment of the present invention as follows.

The power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #B (or channel #D) based discovery signal→channel #A based D2eNB communication related control information".

Alternatively, the power configuration values may be set to be changed in the order of "channel #B based D2D communication related data information→channel #B (or channel #D) based discovery signal→channel #B based D2D communication related control information or data/control information (for example, a case where data information and control information are transmitted together, or a case where control information is transmitted together with data information by piggy-back)→channel #A based D2eNB communication related control information".

Of course, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information→channel #B (or channel #D) based discovery signal".

If the fourth embodiment of the present invention is additionally considered, the power configuration values may be set to be changed in the order of "channel #B based D2D communication related data information→channel #A based D2eNB communication related control information→channel #B based D2D communication related control information or data/control information (for example, a case where data information and control information are transmitted together, or a case where control information is transmitted together with data information by piggy-back)→channel #B (or channel #D) based discovery signal".

Alternatively, the power configuration values may be set to be changed in the order of "channel #B based D2D communication related data information→channel #A based D2eNB communication related control information→channel #B (or channel #D) based discovery signal→channel #B based D2D communication related control information or data/control information (for example, a case where data information and control information are transmitted together, or a case where control information is transmitted together with data information by piggy-back)".

Likewise, according to the fourth embodiment of the present invention, the power configuration values may be set to be changed in the order of "channel #A based D2eNB communication related control information→channel #B based D2D communication related data information→channel #B based D2D communication related control information or data/control information (for example, a case where data information and control information are transmitted together, or a case where control information is transmitted together with data information by piggy-back)→channel #B (or channel #D) based discovery signal".

Alternatively, the power configuration values may be set to be changed in the order of "channel #A based D2eNB communication related control information→channel #B based D2D communication related data information→channel #B (or channel #D) based discovery signal→channel #B based D2D communication related control information or data/control information (for example, a case where data information and control information are transmitted together, or a case where control information is transmitted together with data information by piggy-back)".

Also, power control of the user equipment may be performed by combination of the second embodiment related to the aforementioned eNB2D communication and the fourth embodiment of the present invention.

For example, it is assumed that power control is performed by the fourth embodiment of the present invention depending on whether eNB2D communication related specific control information which is previously defined is transmitted based on the channel #A.

In other words, if D2eNB communication related specific control information which is previously defined is transmitted based on the channel #A, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #B (or channel #D) based discovery signal→channel #A based D2eNB communication related control information", in the order of "channel #B based D2D communication related data information→channel #B (or channel #D) based discovery signal→channel #B based D2D communication related control information or data/control information (for example, a case where data information and control information are transmitted together, or a case where control information is transmitted together with data information by piggy-back)→channel #A based D2eNB communication related control information", or in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information-→channel #B (or channel #D) based discovery signal".

By contrast, if D2eNB communication related specific control information which is previously defined is not transmitted based on the channel #A, the power configuration values may be set to be changed in the order of "channel #B based D2D communication related data information→channel #A based D2eNB communication related control information→channel #B based D2D communication related control information or data/control information (for example, a case where data information and control information are transmitted together, or a case where control information is transmitted together with data information by piggy-back)→channel #B (or channel #D) based discovery signal", or in the order of "channel #B based D2D communication related data information→channel #A based D2eNB communication related control information→channel #B (or channel #D) based discovery signal→channel #B based D2D communication related control information or data/control information (for example, a case where data information and control information are transmitted together, or a case where control information is transmitted together with data information by piggy-back)".

For another example, if D2eNB communication related specific control information which is previously defined is transmitted based on the channel #A, the power configuration values may be set to be changed in the order of "channel #B based D2D communication related data information-→channel #A based D2eNB communication related control information→channel #B based D2D communication related control information or data/control information (for example, a case where data information and control information are transmitted together, or a case where control information is transmitted together with data information by piggy-back)→channel #B (or channel #D) based discovery signal", or in the order of "channel #B based D2D communication related data information→channel #A based D2eNB communication related control information→channel #B (or channel #D) based discovery signal→channel #B based D2D communication related control information or data/control information (for example, a case where data information and control information are transmitted together, or a case where control information is transmitted together with data information by piggy-back)".

By contrast, if D2eNB communication related specific control information which is previously defined is not transmitted based on the channel #A, the power configuration values may be set to be changed in the order of "channel #A based D2eNB communication related control information-→channel #B based D2D communication related data information→channel #B based D2D communication related control information or data/control information (for example, a case where data information and control information are transmitted together, or a case where control information is transmitted together with data information by piggy-back)→channel #B (or channel #D) based discovery signal", or in the order of "channel #A based D2eNB communication related control information→channel #B based D2D communication related data information→channel #B (or channel #D) based discovery signal→channel #B based D2D communication related control information or data/control information (for example, a case where data information and control information are transmitted together, or a case where control information is transmitted together with data information by piggy-back)".

Likewise, power control of the user equipment may be performed by combination of the third embodiment related to the aforementioned D2D communication and the fourth embodiment of the present invention.

For example, if D2D communication related specific control information which is previously defined is transmitted based on the channel #B, the power configuration values may be set to be changed in the order of "channel #B based D2D communication related data information→channel #A based D2eNB communication related control information→channel #B based D2D communication related control information or data/control information (for example, a case where data information and control information are transmitted together, or a case where control information is transmitted together with data information by piggy-back)→channel #B (or channel #D) based discovery signal", or in the order of "channel #B based D2D communication related data information→channel #A based D2eNB communication related control information→channel #B (or channel #D) based discovery signal→channel #B based D2D communication related control information or data/control information (for example, a case where data information and control information are transmitted together, or a case where control information is transmitted together with data information by piggy-back)".

By contrast, if D2D communication related specific control information which is previously defined is not transmitted based on the channel #B, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #B (or channel #D) based discovery signal→channel #A based D2eNB communication related control information", in the order of "channel #B based D2D communication related data information→channel #B (or channel #D) based discovery signal→channel #B based D2D communication related control information or data/control information (for example, a case where data information and control information are transmitted together, or a case where control information is transmitted together with data information by piggy-back)→channel #A based D2eNB communication related control information", or in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information→channel #B (or channel #D) based discovery signal".

For another example, if D2D communication related specific control information which is previously defined is transmitted based on the channel #B, the power configuration values may be set to be changed in the order of "channel #B based D2D communication related data information→channel #B based D2D communication related control information or data/control information (for example, a case where data information and control information are transmitted together, or a case where control information is transmitted together with data information by piggy-back)→channel #B (or channel #D) based discovery signal→channel #A based D2eNB communication related control information", in the order of "channel #B based D2D communication related data information→channel #B (or channel #D) based discovery signal→channel #B based D2D communication related control information or data/control information (for example, a case where data information and control information are transmitted together, or a case where control information is transmitted together with data information by piggy-back)→channel #A based D2eNB communication related control information", or in the order of "channel #B based D2D communication related data information→channel #B based D2D communication related control information or data/control information (for example, a case where data information and control information are transmitted together, or a case where control information is transmitted together with data information by piggy-back)→channel #A based D2eNB communication related control information→channel #B (or channel #D) based discovery signal".

By contrast, if D2D communication related specific control information which is previously defined is not transmitted based on the channel #B, the power configuration values may be set to be changed in the order of "channel #B based D2D communication related control information or data/control information (for example, a case where data information and control information are transmitted together, or a case where control information is transmitted together with data information by piggy-back)→channel #B (or channel #D) based discovery signal→channel #B based D2D communication related data information→channel #A based D2eNB communication related control information", in the order of "channel #B (or channel #D) based discovery signal→channel #B based D2D communication related control information or data/control information (for example, a case where data information and control information are transmitted together, or a case where control information is transmitted together with data information by piggy-back)→channel #B based D2D communication related data information→channel #A based D2eNB communication related control information", or in the order of "channel #B based D2D communication related control information or data/control information (for example, a case where data information and control information are transmitted together, or a case where control information is transmitted together with data information by piggy-back)→channel #B based D2D communication related data information→channel #A based D2eNB communication related control information→channel #B (or channel #D) based discovery signal".

Although the aforementioned embodiments of the present invention disclose a method for enabling a user equipment to control a power for different kinds of channels or different kinds of information, when considering interference (for example, interference on D2eNB communication between different user equipment groups which perform D2D communication or between the user equipment and the base station) generated due to D2D communication, in view of overall network throughput, it may not be preferable that D2D communication related control/data information is changed to a high power value on the basis of the suggested methods to satisfy a maximum allowance value of the difference in the power configuration values between the channels.

Also, if the transmission power of the D2eNB communication related control/data information is changed to a lower level to reduce interference generated from D2D communication and satisfy the maximum allowance value of the difference in the power configuration values between the channels which are previously designated, received throughput of the corresponding D2eNB communication may be reduced.

Accordingly, according to the present invention, if the difference in the power configuration values between different kinds of channels (or information) simultaneously transmitted at a specific time exceeds the maximum allowance value of the difference in the power configuration values designated in accordance with the present invention, the user equipment may drop or omit some of the channels (or information) transmitted at the corresponding time, on the basis of the priority rule which is previously defined. Also, the user equipment may drop some of the channels (or information) transmitted at a duplicated time interval even between different channels duplicately transmitted at some time interval.

In this case, the priority for application of dropping or omitting operation may be defined on the basis of a type of information transmitted through a specific channel or importance priority per information, which is previously defined. In other words, the specific channel (or information) may be dropped in accordance with the priority for the change of the power configuration values per channel, which are described in the first to fourth embodiments of the present invention.

Also, if D2D communication is used for broadcasting (for example, emergent broadcast) or group casting, which is previously defined, the priority related to dropping or power re-configuration may be varied depending on the rule which is previously defined.

In other words, in the aforementioned embodiments of the present invention, the priority rule related to dropping or power re-configuration may be varied depending on a D2D service type (for example, broadcast D2D, group cast D2D, unicast D2D, etc.). For example, if D2D communication is used for broadcasting (for example, emergent broadcast), the highest priority may be configured for the priority related to dropping or power re-configuration.

Also, according to the present invention, if the user equipment performs signal transmission (for example, control/data/reference signal) for D2eNB communication and signal transmission (for example, data/control/reference signal/discovery signal) for D2D communication simultaneously at a specific time or duplicately at some time interval, the transmission power per channel may be scaled down in accordance with the priority configuration which is previously defined or some of the channels may be dropped or omitted when sum of the power configuration value of channel #X used for D2eNB communication and the power configuration value of channel #Y used for D2D communication exceeds the range of the maximum power value P_max that may be set at a specific time (or time interval) of the user equipment, whereby the user equipment may be operated to satisfy the range of the maximum power value.

For example, the priority rule for the scale-down operation of the transmission power per channel or dropping or omitting operation of some of the channels according to the present invention may be defined such that the channel #Y for D2D communication is prior to the channel #X for D2eNB communication. Alternatively, if corresponding information is transmitted through the channel #X depending on the presence of D2eNB communication related specific information transmission which is previously defined, the priority rule may be defined such that the channel #X is prior to the channel #Y. If not so, the priority rule may be defined such that the channel #Y is prior to the channel #X. Likewise, if corresponding information is transmitted through the channel #Y depending on the presence of D2D communication related specific information transmission which is previously defined, the priority rule may be defined such that the channel #Y is prior to the channel #X. If not so, the priority rule may be defined such that the channel #X is prior to the channel #Y.

Also, in another method for configuring a priority in accordance with the present invention, if priority configuration is defined to be applied when sum of the power configuration values of D2eNB communication related channels simultaneously transmitted at a specific time or duplicately transmitted at some time interval exceeds the range of the maximum power value of the user equipment, this priority configuration may be varied if D2D communication related signal (for example, discovery signal) or information is transmitted onto the channel used for D2eNB communication.

For example, although the priority for D2eNB communication is previously configured in the order of "SRS_D2eNB→PUSCH without UCI_D2eNB→PUSCH with UCI_D2eNB→PUCCH_D2eNB", it may be assumed that D2D communication related signal (for example, discovery signal) is transmitted through a PUSCH region, some resource region of the PUSCH region, or a reference signal (for example, DM-RS or SRS) region.

Accordingly, under the assumption, the priority rule may be configured to be changed in the order of "SRS→PUSCH with UCI→"D2D communication related signal (for example, discovery signal) transmission through PUSCH without UCI→PUCCH" or "PUSCH without UCI→D2D communication related signal (for example, discovery signal) transmission through SRS→PUSCH with UCI-→PUCCH". In other words, the existing priority configuration of D2eNB communication may be changed in accordance with the rule which is previously defined. In this case, the priority may be configured in the same manner as the description disclosed in the first to fourth embodiments of the present invention.

Accordingly, the channels of higher priority may be scaled down or dropped later.

Also, the power control method disclosed in the present invention may be applied to even a case where (uplink) component carrier (that is, "CC_D2eNB") for D2eNB communication and (uplink) component carrier (that is, "CC_D2D") for D2D communication are configured differently from each other under the environment to which carrier aggregation (CA) is applied. In other words, if the user equipment transmits a signal (for example, channel #X) for D2eNB communication and a signal (for example, channel #Y) for D2D communication simultaneously at a specific time or duplicately at some time interval, the power control method disclosed in the present invention may be applied to even a case where sum of the power configuration value of the channel #X on the CC_D2eNB and the power configuration value of the channel #Y on the CC_D2D exceeds the maximum power value P_max that may be set at a specific time or specific time interval of the user equipment.

Accordingly, for example, in order to give the priority to the channel #Y for D2D communication prior to the channel #X for D2eNB communication, the priority may be configured in the order of "SRS_D2eNB→SRS_D2D→PUSCH without UCI_D2eNB→PUSCH without UCI_D2D→PUSCH with UCI_D2eNB→PUSCH with UCI_D2D→PUCCH_D2eNB→PUCCH_D2D".

For another example, in order to give the priority to the channel #X for D2eNB communication prior to the channel #Y for D2D communication, the priority may be configured in the order of "SRS_D2D→SRS_D2eNB→PUSCH without UCI_D2D→PUSCH without UCI_D2eNB→PUSCH with UCI_D2D→PUSCH with UCI_D2eNB→PUCCH_D2D→PUCCH_D2eNB".

Alternatively, in order to apply the changed priority if the D2D communication related signal or information is transmitted onto the channel used for D2eNB communication, the priority may be configured in the order of "SRS-→PUSCH with UCI→D2D communication related signal (for example, discovery signal) transmission through PUSCH without UCI→PUCCH" or "PUSCH without UCI→D2D communication related signal (for example, discovery signal) transmission through SRS→PUSCH with UCI→PUCCH".

Moreover, the priority may be configured depending on the presence of the specific information transmission or as disclosed in the first to fourth embodiments of the present invention.

Accordingly, the present invention may be applied to even a case where D2eNB communication and D2D communication are performed through the same (uplink) component carrier. Also, the aforementioned embodiments of the present invention may be applied to even a case where the maximum allowance value of the difference in the power configuration values between the channels is additionally defined or not.

Also, according to the present invention, the discovery signal/channel (that is, D2D discovery) for D2D communication may be prior to PUSCH without UCI and/or PUSCH with UCI (that is, 'D2eNB PUSCH') on the D2eNB link. Accordingly, if D2D discovery transmission and D2eNB PUSCH transmission are duplicated at the same time (or some time interval) or if power sum of the corresponding signals exceeds the maximum allowance power of the user equipment while the corresponding signals are transmitted at the same time, D2eNB PUSCH transmission may be dropped or omitted, or D2eNB PUSCH transmission power may be scaled down prior to D2D discovery.

Moreover, in the present invention, if D2D communication is performed through a specific channel #B (for example, PUSCH) which is previously designated, an additional power control parameter for the corresponding D2D communication may be configured.

For example, if D2D communication is performed on the basis of the existing uplink resource, power control for the D2D communication may be performed in such a manner that the power control parameter for D2D communication is additionally defined on configuration (for example, equation for power control) for existing PUSCH power control (for example, D2eNB PUSCH power control).

For example, the power control parameter for D2D communication, which is additionally defined in the present invention, may be defined in the form of PO_D2D or PD2D_OFFSET. Also, such a power control parameter for D2D communication may be notified from the base station to the user equipment through higher layer signaling or physical layer signaling.

Moreover, additional definition of the power control parameter according to the present invention may be applied to even a case where D2D communication and D2eNB communication are performed through different resource regions within the corresponding channel #B region on the basis of the same channel #B (for example, PUSCH) which is previously defined. Also, additional definition of the power control parameter according to the present invention may be applied to even a case where the maximum allowance value of the difference in power configuration values between the channels is additionally defined or not in the methods suggested in the present invention, which are disclosed in the first to fourth embodiments of the present invention.

For the example of the power control parameter according to the present invention, it is assumed that different kinds of channels (or information) simultaneously transmitted (or duplicately transmitted at some time interval, for example, D2D communication related control/data transmission channel and D2eNB uplink communication related control/data transmission channel exist. In this case, in order to avoid the difference of the power configuration values between the different kinds of channels, the user equipment may be configured to report the difference in the power configuration values between different kinds of channels (or information) to the base station at a specific time in accordance with the rule which is previously defined. In other words, the difference in the power configuration values between the different kinds of channels, which is reported from the user equipment, may be regarded as "power difference information".

Accordingly, the base station that has received information (hereinafter, referred to as power difference information) on the difference in the power configuration values between the different kinds of channels from the user equipment may (re)-control the transmission power related to some channels (or information), which are previously defined among the different kinds of channels (or information), or the transmission power related to all the channels (or information) so as to not exceed a maximum allowance transmission power difference value PGAP_MAX which is previously defined.

Particularly, since the base station cannot exactly identify whether the user equipment has successfully received a transmission power control command (for example, TPC command) and thus cannot identify the exact transmission power of D2eNB uplink communication related control/data, information (that is, power difference information) reported by the user equipment may usefully be used for power control of the base station.

Moreover, in the present invention, the base station may be configured to allow the user equipment to report information on a period, resource, etc., which are related to reporting of the corresponding information (that is, power difference information), through previously defined signaling (for example, physical layer signaling or higher layer signaling).

Also, although the base station may be configured to allow the user equipment to periodically report the corresponding information, the power difference information related reporting operation of the user equipment may be configured to be restrictively performed only if a previously defined event is triggered (aperiodic reporting). As an embodiment of aperiodic reporting, the user equipment may be configured to report the power difference information to the base station only if the user equipment transmits uplink data (PUSCH) to the base station.

Also, the status reflected by the information (that is, power difference information) reported from the user equipment to the base station or the time when the power difference information is calculated may be configured to reflect the status prior to a time value (for example, 4 ms), which is previously defined, from the actual reporting time, or the status of the time when the event (for example, uplink scheduling information (UL grant) related to uplink communication between the base station and the user equipment is received by the user equipment) interacted with the reporting operation of the power difference information is generated.

Moreover, if the user equipment is configured to perform periodic reporting, it is preferable that the user equipment performs reporting by reflecting the status prior to the time value, which is previously defined, from the actual reporting time. Also, if the user equipment is configured to perform aperiodic reporting, it is preferable that the user equipment performs reporting by reflecting the status at the time when the event interacted with the reporting operation of the power difference information is generated.

Figure 12A:
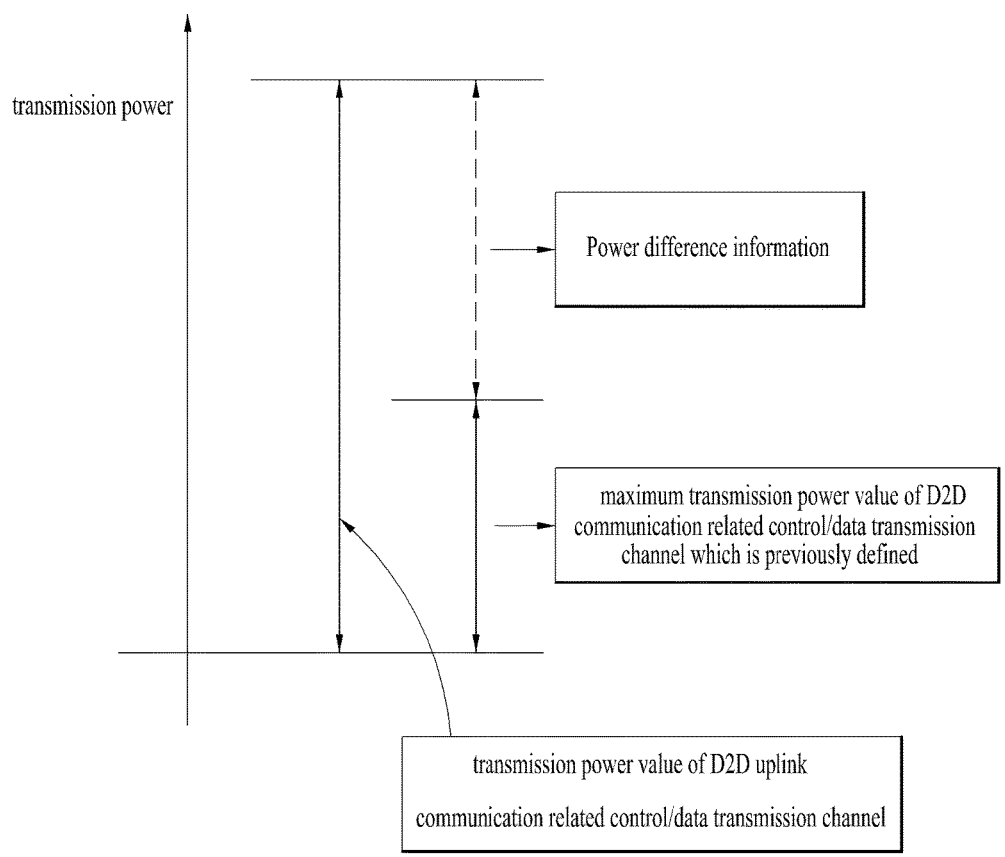
FIGS. 12A and 12B are reference diagrams illustrating configuration on power difference information according to the present invention.
Figure 12B:
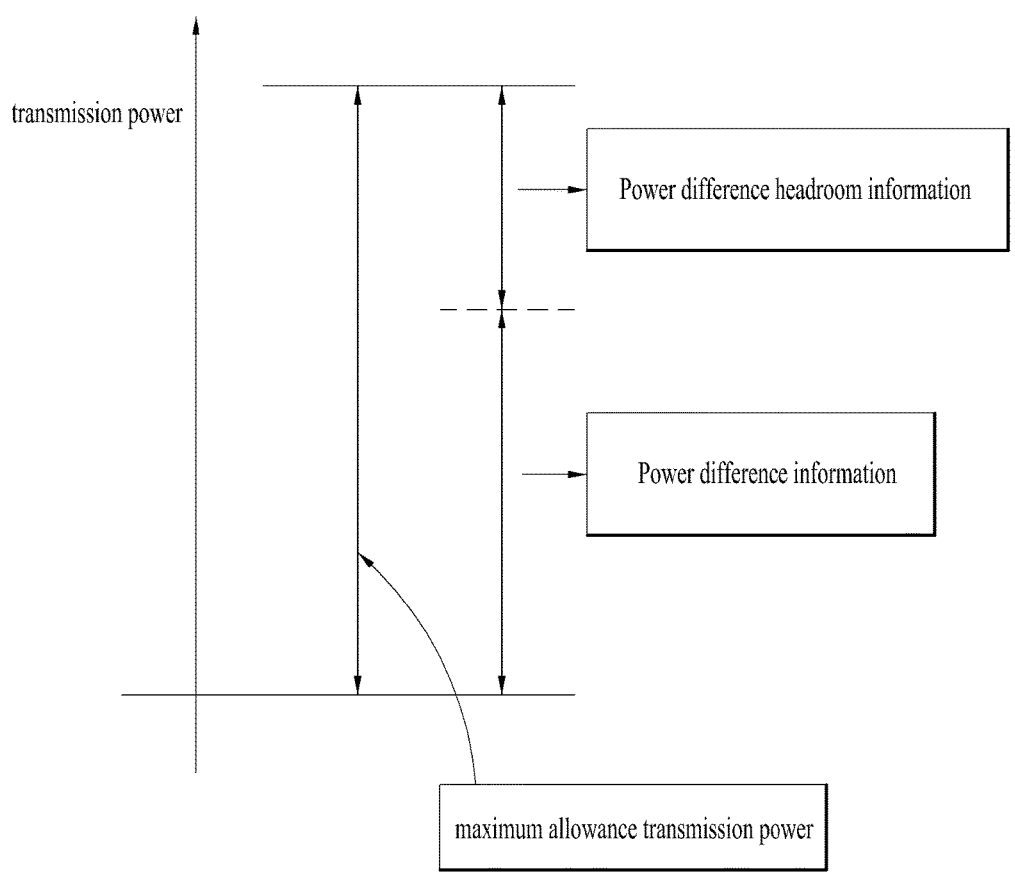

FIGS. 12A and 12B are reference diagrams illustrating configuration on power difference information according to the present invention.

Referring to FIG. 12A, the difference information in the power configuration values (that is, power difference information), which may be allowed between different kinds of channels (or information) at a specific time when the user equipment performs reporting, may be configured to be determined on the basis of "the difference between the transmission power value of the D2eNB uplink communication related control/data transmission channel at the corresponding time and the maximum transmission power value of the D2D communication related control/data transmission channel which is previously defined".

Alternatively, in FIG. 12A, the power difference information may be configured to be determined using "the transmission power value of the D2D communication related control/data transmission channel at the corresponding time" not "the "maximum" transmission power value of the D2D communication related control/data transmission channel which is previously defined". In other words, the difference information in the power configuration values (that is, power difference information), which may be allowed between different kinds of channels (or information) at a specific time when the user equipment performs reporting, may be configured to be determined on the basis of "the difference between the transmission power value of the D2eNB uplink communication related control/data transmission channel at the corresponding time and the transmission power value of the D2D communication related control/data transmission channel at the corresponding time".

As another embodiment, in FIG. 12A, the power difference information may be configured to be determined by modifying "the transmission power value of the D2eNB uplink communication related control/data transmission channel at the corresponding time" to "the difference between the transmission power value of the D2eNB uplink communication related control/data transmission channel at the corresponding time and the minimum transmission power value of the D2D communication related control/data transmission channel which is previously defined". In other words, the difference information in the power configuration values (that is, power difference information), which may be allowed between different kinds of channels (or information) at a specific time when the user equipment performs reporting, may be configured to be determined on the basis of "the difference between the transmission power value of the D2eNB uplink communication related control/data transmission channel at the corresponding time and the minimum transmission power value of the D2D communication related control/data transmission channel which is previously defined" or "the difference between the transmission power value of the D2eNB uplink communication related control/data transmission channel at the corresponding time and the nominal transmission power value of the D2D communication related control/data transmission channel which is previously defined".

Also, as shown in FIG. 12B, as still another embodiment of the power difference information according to the present invention, the user equipment may be configured to report the difference information in the power configuration values, which may additionally be allowed between different kinds of channels (or information) at the specific time, in accordance with a rule which is previously defined. In other words, the difference between the power configuration values, which may additionally be allowed between different kinds of channels at the specific time, may be regarded as "power difference headroom information". Moreover, the base station may notify the user equipment of information on the maximum allowance transmission power difference value PGAP_MAX through signaling (for example, physical layer signaling or higher layer signaling) which is previously defined.

Accordingly, if the user equipment is configured to report the difference (hereinafter, referred to as power difference headroom information) between the power configuration values, which may additionally be allowed between different kinds of channels at the specific time, the user equipment may be configured to notify the base station of information (that is, power difference headroom information) on the other value obtained by subtracting "the difference between the transmission power value of the D2eNB uplink communication related control/data transmission channel at the corresponding time and the maximum transmission power value of the D2D communication related control/data transmission channel which is previously defined" from "the maximum allowance transmission power difference value".

For another example, the user equipment may be configured to report information (that is, power difference headroom information) on the other value obtained by subtracting "the difference between the transmission power value of the D2eNB uplink communication related control/data transmission channel at the corresponding time and the transmission power value of the D2D communication related control/data transmission channel at the corresponding time" from "the maximum allowance transmission power difference value".

For still another example, the user equipment may be configured to report information (that is, power difference headroom information) on the other value obtained by subtracting "the difference between the transmission power value of the D2eNB uplink communication related control/data transmission channel at the corresponding time and the minimum transmission power value of the D2D communication related control/data transmission channel which is previously defined" from "the maximum allowance transmission power difference value".

For further still another example, the user equipment may be configured to report information (that is, power difference headroom information) on the other value obtained by subtracting "the difference between the transmission power value of the D2eNB uplink communication related control/data transmission channel at the corresponding time and the nominal transmission power value of the D2D communication related control/data transmission channel which is previously defined" from "the maximum allowance transmission power difference value".

Moreover, if the different information (that is, power difference headroom information), which is reported by the user equipment and may additionally be allowed, has a negative value, the base station may (re-)control the transmission power related to some channels (or information) which are previously defined among different kinds of channels (or information) or the transmission power related to all the channels (or information), so as not to exceed the maximum allowance transmission power difference value which is previously defined.

For example, if the difference information exceeds the maximum allowance transmission power difference value, the power difference headroom information may have a negative value. In this case, the base station may (re-)control the transmission power related to previously defined D2eNB uplink communication related control/data transmission channel among different kinds of channels so as not to exceed the maximum allowance transmission power difference value which is previously defined.

The aforementioned embodiments of the present invention may be applied to even a case where different channels (for example, channel #A and channel #B (or channel #C or channel #D)) simultaneously transmitted at a specific time or duplicately transmitted at some time interval are transmitted through different component carriers or different cells under the environment to which carrier aggregation (CA) is applied.

Also, the aforementioned embodiments of the present invention may be applied to even all the cases where the number of channels simultaneously transmitted at a specific time or duplicately transmitted at some time interval is two or more.

Additionally, in the embodiments of the present invention, D2eNB communication related control/data information transmission may be limited to D2eNB communication related uplink control/data information transmission.

Also, in the embodiments of the present invention, information on application of specific configuration (or rule) may be configured to be notified from the base station to the user equipment through previously defined signaling (for example, physical layer signaling or higher layer signaling), or may be configured to be implicitly identified on the basis of previously defined configuration (for example, if D2D communication mode is configured, it is defined that some configurations may be applied implicitly). Additionally, the embodiments of the present invention may be configured to be restrictively applied depending on D2D service type (for example, broadcast D2D, groupcast D2D, unicast D2D, etc.). Also, the embodiments of the present invention may be configured to be restrictively applied under a specific D2D communication environment (for example, out-of-coverage environment, in-coverage D2D environment, partial-coverage D2D environment) only.

Figure 13:
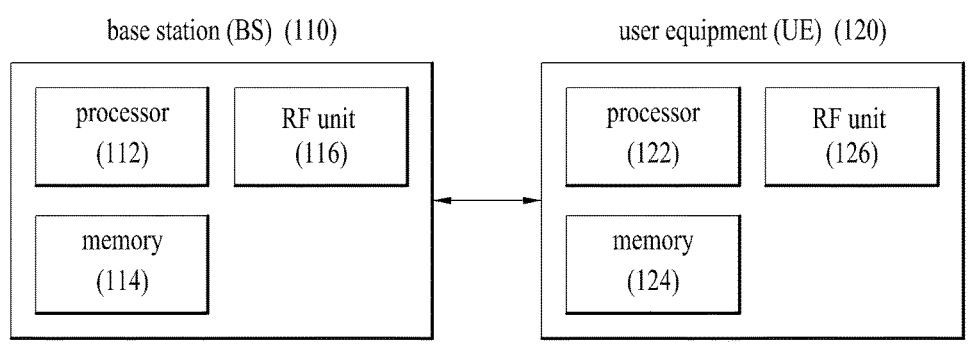
FIG. 13 is a diagram illustrating a base station and a user equipment, which may be applied to the embodiment of the present invention.

FIG. 13 is a diagram illustrating a base station and a user equipment, which may be applied to the embodiment of the present invention.

If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 13, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been herein described as being performed by the base station may be performed by an upper node of the base station as the case may be. In other words, it will be apparent that various operations performed for communication with the user equipment in the network which includes a plurality of network nodes including the base station may be performed by the base station or network nodes other than the base station. The 'base station' (BS) may be replaced with terminologies such as a fixed station, Node B, eNode B (eNB), and an access point (AP).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for controlling a power for D2D (Device-to-Device) communication in a wireless communication system and the apparatus for the same have been described based on the 3GPP LTE system, the method and apparatus may be applied to various wireless communication systems in addition to the 3GPP LTE system.

The invention claimed is:

1. A method for enabling a user equipment (UE) to control a power in a wireless communication system, the method comprising:
    receiving, by the UE, a configuration for configured maximum output power for uplink transmission power for a UE-to-evolved NodeB (UE-eNB) transmission and a Device-to-Device (D2D) transmission via higher layer signaling;
    receiving, by the UE, one or more channel resource configurations for the UE-eNB transmission and the D2D transmission and sets of parameters configured for the UE-eNB transmission and the D2D transmission,
    wherein each of the sets of parameters is respectively associated with a corresponding channel resource configuration;
    if a time period for the UE-eNB transmission is set, determining UE-eNB transmission power in association with resource assignment for a specific channel within the time period according to a specific channel resource configuration among the one or more channel resource configurations, based on the set of parameters corresponding to the UE-eNB communication; and
    if a time period for the D2D transmission is set, determining D2D transmission power in association with a resource assignment for a specific channel within the time period according to a specific channel resource configuration among the one or more channel resource configurations, based on the set of parameters corresponding to the D2D transmission,
    wherein, when the D2D transmission power exceeds the configured maximum output power for uplink transmission power, the D2D transmission power is set to be equal to or less than the configured maximum output power for uplink transmission power.

2. A user equipment (UE) for controlling a power in a wireless communication system, the UE comprising:
    a radio frequency unit; and
    a processor coupled to the radio frequency unit,
    wherein the processor is configured to:
        control the radio frequency unit to receive a configuration for configured maximum output power for uplink transmission power for a UE-to-evolved NodeB (UE-eNB) transmission and a Device-to-Device (D2D) transmission via higher layer signaling,
        control the radio frequency unit to receive one or more channel resource configurations for the UE-eNB transmission and the D2D transmission and sets of parameters configured for the UE-eNB transmission and the D2D transmission,
        wherein each of the sets of parameters is respectively associated with a corresponding channel resource configuration,
        if a time period for the UE-eNB transmission is set, determine UE-eNB transmission power in association with resource assignment for a specific channel within the time period according to a specific channel resource configuration among the one or more channel resource configurations, based on the set of parameters corresponding to the UE-eNB communication, and
        if a time period for the D2D transmission is set, determine D2D transmission power in association with a resource assignment for a specific channel within the time period according to a specific channel resource configuration among the one or more channel resource configurations based on the set of parameters corresponding to the D2D transmission,
        wherein, when the D2D transmission power exceeds the configured maximum output power for uplink transmission power, the D2D transmission power is set to be equal to or less than the configured maximum output power for uplink transmission power.

* * * * *